Jan. 5, 1971  W. C. PRZYGOCKI  3,552,067
ABRASIVE BELT DETECTOR
Filed Jan. 17, 1969

INVENTOR.
Witold C. Przygocki.
BY
Harness, Dickey & Pierce
ATTORNEYS

United States Patent Office 3,552,067
Patented Jan. 5, 1971

3,552,067
ABRASIVE BELT DETECTOR
Witold C. Przygocki, Southfield, Mich., assignor to Murray-Way Corporation, Birmingham, Mich., a corporation of Michigan
Filed Jan. 17, 1969, Ser. No. 791,960
Int. Cl. B24b 21/18
U.S. Cl. 51—135         8 Claims

ABSTRACT OF THE DISCLOSURE

Apparatus for use with an endless abrasive belt operable from air flow to automatically oscillate the belt transversely and to provide detection for broken belt or overtravel to automatically stop the movement of the belt.

SUMMARY BACKGROUND OF THE INVENTION

The present invention relates to apparatus for detecting and controlling the movement of an endless abrasive belt.

In the past, apparatus has been provided for endless abrasive belts to automatically oscillate the belt transversely to its direction of travel. This prevents the belt from "walking off" the support rolls and tends to improve belt life, i.e. by more evenly distributing wear. In addition, separate apparatus has been used to determine belt breakage and/or overtravel of the belt in either direction. In the present invention, the oscillator detector and the belt breakage and/or over-travel detector have been combined to provide for a simple, compact detecting device.

Therefore, it is an object of the present invention to provide novel detecting apparatus for use with endless abrasive belts for controlling the movement thereof.

It is another object of the present invention to provide a compact detecting device for controlling the transverse oscillation of an endless abrasive belt and for detecting the occurrence of belt breakage and/or overtravel.

Figure 1:
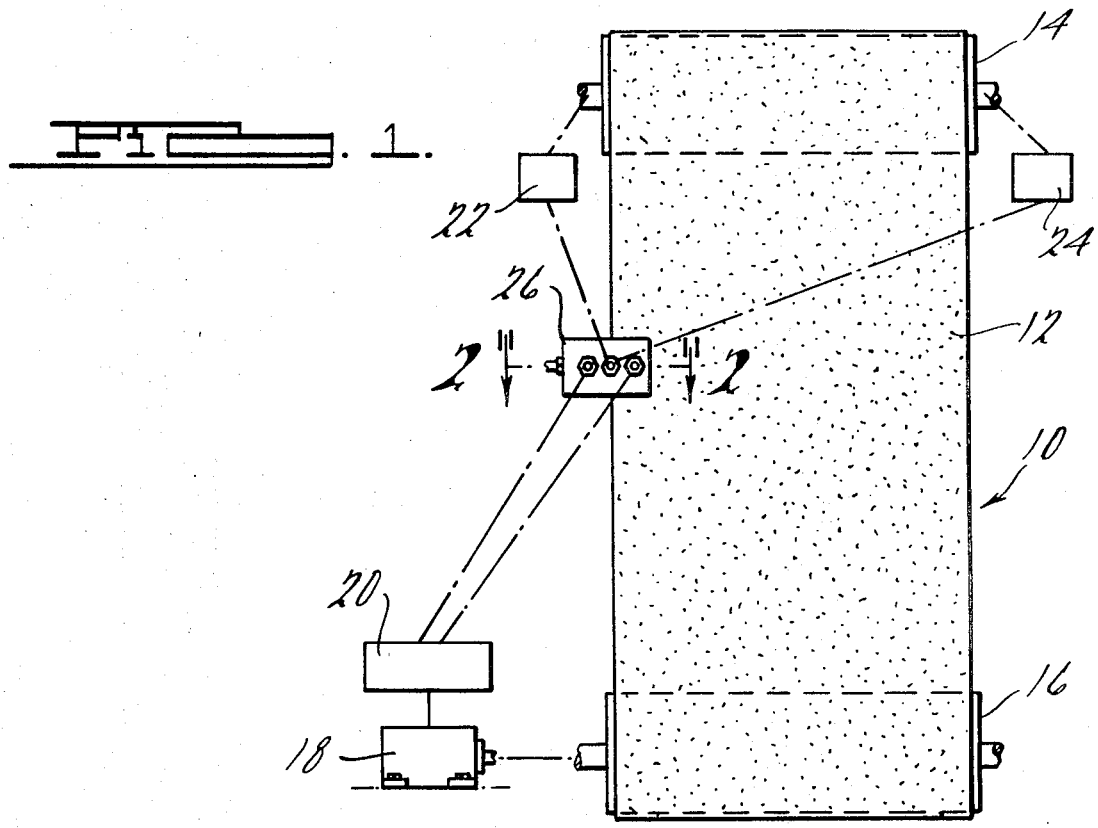
Figure 2:
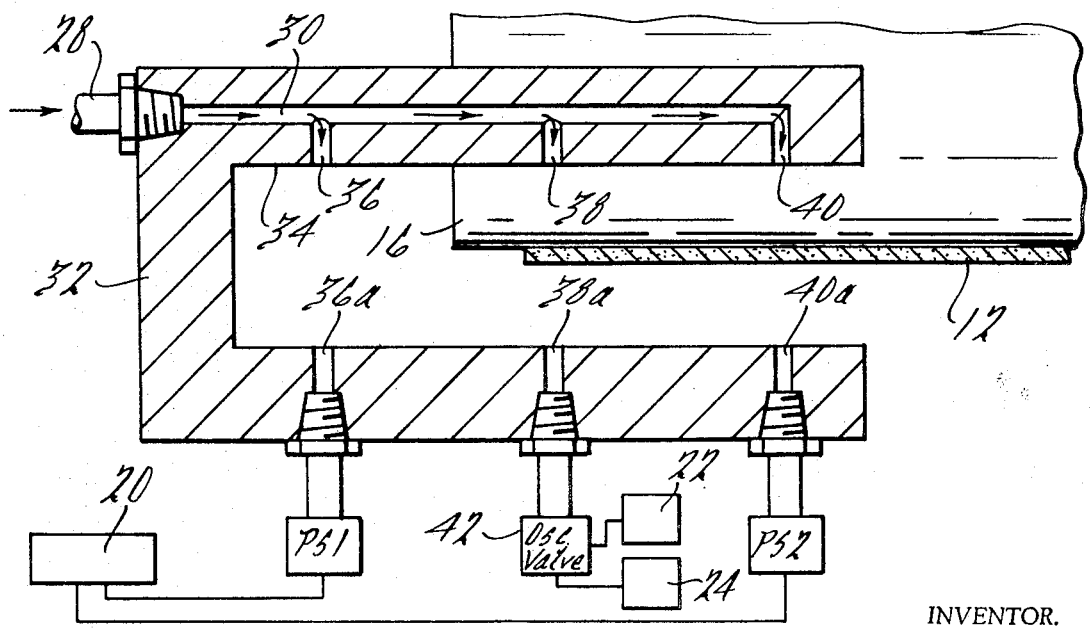

Other objects, features, and advantages of the present invention will become apparent from the subsequent description and the appended claims, taken in conjunction with the accompanying drawings in which:

FIG. 1 is an elevational view showing the detecting apparatus of the present invention in assembly relation with an endless abrading belt assembly; and FIG. 2 is an enlarged sectional view of the apparatus of FIG. 1 taken substantially along the lines 2—2.

In FIG. 1, an abrading belt assembly is generally indicated by the numeral 10 and includes an endless abrasive belt 12 supported for movement on spaced rolls 14 and 16. The roll 16 can be driven by a motor 18 the actuation of which is controlled by a motor control apparatus 20. Oscillating apparatus in the form of devices 22 and 24 are operatively connected to roller 14 to alternately pivot the roller 14 vertically from side to side whereby the belt 12 will move transversely first towards one side and then towards the other. This action is accomplished by devices 22 and 24 in accordance with signal received from detector assembly 26.

The assembly 26 is air actuated from a source (not shown) of air under pressure which is transmitted via an inlet 28 into a common passage 30 extending through a U-shaped body 32. The body 32 has a slot 34 which receives the end portion of the belt 12, such that that portion of the belt 12 will be continuously moving through slot 34 as the belt 12 is moved.

The passage 30 communicates with three outlet ports 36, 38 and 40 all of which communicate with the slot 34.

Three sensing ports 36a, 38a and 40a are located at the opposite side of slot 34 and in line with ports 36, 38 and 40, respectively. The sensing ports 36a and 40a are connected to pressure actuated switches PS1 and PS2, respectively, while the sensing port 38a is connected to a pressure switch in an oscillator control valve assembly 42. The pressure switches PS1 and PS2 are electrically connected to motor control apparatus 20, while the control valve assembly 42 is connected to the devices 22 and 24.

In operation the valve assembly 42 has a pressure actuated switch which has two positions; the switch is in one position when air flow from port 38 to sensing port 38a is blocked by the belt 12 and in another position when the flow is not blocked. The first condition occurs when the edge of belt 12 is to the left of the ports 38, 38a and the second condition occurs when the edge of the belt is to the right of the ports 38, 38a. When air flow is blocked and the switch of valve assembly 42 is in its first position the devices 22 and 24 are actuated to vertically pivot the roller 14 clockwise to cause the belt 12 to move to the right. When the edge of belt 12 moves past the ports 38, 38a and air flow therebetween occurs the switch is moved to its other position in which the devices 22 and 24 are actuated to vertically pivot the roller 14 counterclockwise to cause the belt 12 to move to the left. This sequence continues resulting in continuous oscillation of the belt 12 in a direction transversely to its direction of travel.

The pressure switches PS1 and PS2 sense belt overtravel or breakage. Each of the switches PS1 and PS2 has a position in which the motor control apparatus 20 is not affected and a different position in which the motor control apparatus 20 is activated to cause de-energization of motor 18 and hence cause the roller 16 and belt 12 to stop. As long as air flow continues between ports 36 and 36a switch PS1 will not affect the motor control apparatus 20. However, in the event of overtravel of the belt 12 to the left to a position blocking air flow between ports 36 and 36a switch PS1 will be moved to its other position to actuate motor control 20 to stop motor 18. In the event of belt breakage or overtravel to the right, air flow will occur between ports 40 and 40a to move switch PS2 to its different position to actuate motor control 20 to stop motor 18.

Note that with the use of air flow a single sensing mechanism can be used requiring no parts to engage the belt 12. With prior devices a separate overtravel sensor is located at each side of the belt; with the present invention the overtravel and belt breakage sensing is done all at one edge of the belt and can be combined with the belt oscillating sensor resulting in a more compact construction.

In the above description the details of that part of the apparatus which are known to one skilled in the art have been omitted for purposes of simplicity.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. In an endless abrasive belt supported for translational movement on a pair of spaced support rollers and including oscillation apparatus for causing controlled oscillation of the belt transversely to its direction of translational movement in response to first signals and including interrupting means for stopping movement of the belt in response to second signals, sensing apparatus for providing said first and second signals, said sensing apparatus comprising: first sensing means operative at one edge of the belt for providing said first signals in response to the one edge moving between two transversely spaced first points, second sensing means operative at an edge of the belt for providing said second signals in response to that edge moving between two transversely spaced second points, one of said second points being positioned at one location indicative of belt overtravel in one direction and the other of said second points being positioned at another location indicative of belt overtravel in the opposite direction.

2. The sensing apparatus of claim 1 with said second sensing means being operative at the same edge of the belt as said first sensing means.

3. The sensing apparatus of claim 2 with said first and second sensing means being actuated in response to air flow.

4. The sensing apparatus of claim 3 with said second sensing means comprising two transversely spaced pairs of aligned inlets and outlets, with one of said pairs located at said one location and the other of said pairs located at said other location.

5. The sensing apparatus of claim 4 with one of said spaced pairs providing said second signal in response to belt breakage or belt overtravel.

6. The sensing apparatus of claim 5 with said first sensing means comprising a pair of aligned inlets and outlets located between said two pairs.

7. The sensing apparatus of claim 6 comprising a body member having one leg portion on one side of the belt at said one edge and another leg portion on the other side of the belt, all of said outlets being located in one leg portion and all of said inlets being located in the opposite leg portion.

8. The sensing apparatus of claim 7 with all of said outlets being in communication with a common passageway for communicating air under pressure.

References Cited

UNITED STATES PATENTS

| | | | |
|---|---|---|---|
| 2,587,603 | 3/1952 | Czarnecki | 51—143 |
| 2,813,382 | 11/1957 | Pendergast | 51—135 |

OTHELL M. SIMPSON, Primary Examiner